United States Patent
Watanabe et al.

(10) Patent No.: US 12,146,225 B2
(45) Date of Patent: Nov. 19, 2024

(54) METHOD FOR RECYCLING RARE EARTH SINTERED MAGNET

(71) Applicant: SHIN-ETSU CHEMICAL CO., LTD., Tokyo (JP)

(72) Inventors: Ko Watanabe, Fukui (JP); Kazuhito Akada, Echizen (JP); Yuta Kuribara, Makati (PH); Yoshiyuki Hayashi, Fukui (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/859,441

(22) Filed: Jul. 7, 2022

(65) Prior Publication Data

US 2023/0029439 A1 Jan. 26, 2023

(30) Foreign Application Priority Data

Jul. 9, 2021 (JP) ................................ 2021-114321

(51) Int. Cl.
*C23F 1/40* (2006.01)
*C22B 1/00* (2006.01)
*C23F 1/44* (2006.01)

(52) U.S. Cl.
CPC ................ *C23F 1/40* (2013.01); *C22B 1/005* (2013.01); *C23F 1/44* (2013.01)

(58) Field of Classification Search
CPC ... C23F 1/40; C23F 1/44; C22B 1/005; Y02P 10/20; H01F 41/026
USPC ......................................................... 216/22
See application file for complete search history.

(56) References Cited

U.S. PATENT DOCUMENTS

| | | | | |
|---|---|---|---|---|
| 2006/0065627 | A1* | 3/2006 | Clarke | .............. H01L 29/66545 216/17 |
| 2013/0313125 | A1* | 11/2013 | Kamachi | ................ C25D 17/16 205/211 |
| 2019/0153604 | A1* | 5/2019 | Wang | .................. C23C 18/1834 |

FOREIGN PATENT DOCUMENTS

| | | |
|---|---|---|
| CN | 102268674 A | 12/2011 |
| CN | 102644080 B | 6/2013 |
| CN | 103409755 A | 11/2013 |
| CN | 104131284 A | 11/2014 |
| CN | 108193206 A | 6/2018 |
| EP | 2 677 065 A1 | 12/2013 |
| JP | 05-033074 A | 2/1993 |
| JP | 6-88294 | 3/1994 |
| JP | 07-138772 A | 5/1995 |
| JP | 2001-40425 A | 2/2001 |
| JP | 2010-100920 A | 5/2010 |
| WO | WO 03/056582 A1 | 7/2003 |
| WO | WO 2013/132924 A1 | 9/2013 |

OTHER PUBLICATIONS

Translation of JP 07-138772 reference (Year: 1993).*
Master Magnetics, Neodymium Rare Earth Magnets (Year: 2023).*
Translation of JP2001040425 (Year: 2001).*
Extended European Search Report issued Dec. 16, 2022 in European Patent Application No. 22183624.0, 7 pages.
Official Action was issued on Feb. 19, 2024, in corresponding Japanese Application No. 2021-114321(with machine translation).

* cited by examiner

*Primary Examiner* — Duy Vu N Deo
(74) *Attorney, Agent, or Firm* — Oblon, McClelland, Maier & Neustadt, L.L.P.

(57) ABSTRACT

A method for recycling a rare earth magnet is described. The rare earth magnet has a film containing Ni on the surface thereof, and the method involves immersing the rare earth magnet in a stripping solution containing a derivative of nitrobenzene, ethylenediamine, and ammonia. This strips the Ni on the surface of the rare earth magnet without deteriorating the characteristics of the rare earth magnet, thereby improving its product yield.

7 Claims, No Drawings

METHOD FOR RECYCLING RARE EARTH SINTERED MAGNET

CROSS-REFERENCE TO RELATED APPLICATIONS

The present application is based on and claims the benefit of priority to Japanese Application No. 2021-114321, filed Jul. 9, 2021. The entire contents of this application is incorporated herein by reference.

FIELD OF THE INVENTION

The present invention relates to a method for recycling a rare earth magnet, and more particularly to a method for recycling a rare earth magnet by removing a plating film formed on a surface of a neodymium magnet and reusing the neodymium magnet.

BACKGROUND OF THE INVENTION

Rare earth magnets are essential functional materials for energy saving and high functionality, and have been applied to a wide range of fields from general household electric appliances such as air conditioners to automobile applications such as HEV and EV. It is expected that the amount of production will increase more and more in the future, for example, due to the movement of global EV promotion and an increase in demand for ultra-high-capacity HDDs for data centers along with the spread of cloud services and moving image distribution.

A general rare earth magnet is produced by finely pulverizing a raw material alloy adjusted to a predetermined composition in an inert gas atmosphere, compacting the pulverized raw material alloy into a certain size while applying a magnetic field, and sintering the compacted raw material alloy in a vacuum or inert gas atmosphere. The produced rare earth magnet is processed into a product shape by machining or grinding, and is further subjected to surface treatment such as plating or coating to obtain a product. Although losses such as defective products and sludge occur in each step, recycling for reducing these losses is regarded as an important process from the viewpoints of effective utilization of rare resources, reduction in the amount of waste generated, and further reduction in the price of rare earth magnets.

Among the above-described steps, in the surface treatment step, the surface of the rare earth magnet is treated in order to impart corrosion resistance to the rare earth magnet. In general, Ni plating is often performed because of good corrosion resistance and easy mass production. However, in the surface treatment step of applying Ni plating, there is a limit to the improvement of the yield, and it is inevitable that a certain amount of plating defective products is generated. As described above, since rare earth magnets contain rare earth elements, which are precious resources, it has been studied to reuse plating defective products.

For example, PTL 1 describes a technique for removing a Ni film of a rare earth alloy by electrolytic oxidation as a method for safely, easily and inexpensively removing a Ni film when reusing a waste material with a Ni coating generated in a production process of a Ni coating rare earth alloy, and it is reported that electrolytic oxidation is a reaction opposite to electroplating, is easy to control, and can be carried out safely and inexpensively.

In addition, in PTL 2, it is reported that a non-cyanic copper and Ni immersion stripping agent capable of stripping copper and Ni metal or alloy without corroding the base material of an object to be treated such as a neodymium-based magnet can be provided on the premise that a plating film is stripped off and re-plated because a neodymium-based magnet is expensive in a plating treatment failure product generated in a plating treatment.

CITATION LIST

Patent Literature

PTL 1: JP 5-33074 A
PTL 2: JP 7-138772 A

SUMMARY OF THE INVENTION

Technical Problem

However, the technique described in PTL 1 aims at removing the Ni plating film as a pre-stage of extracting the rare earth element from the rare earth alloy, and there is no mention of the magnetic characteristics after removal of the Ni plating, which are important when recycling the rare earth magnet.

In addition, the technique described in PTL 2 has room for improvement in terms of a stripping temperature (room temperature to 90° C., particularly 70° C. to 80° C.). When a rare earth magnet is exposed to a high temperature in a basic solution, the base material may not be corroded and dissolved, but when heating is performed at the time of assembling the rare earth magnet, the characteristics may be deteriorated.

Furthermore, in the technique described in PTL 2, a plating removal rate of usually 2 to 10 μm/hr at a treatment temperature of 70 to 80° C. is reported, but this removal rate cannot be said to be sufficient from the viewpoint of improving the efficiency of the recycling step.

The present invention has been made in view of the above circumstances, and an object of the present invention is to provide a method for recycling a rare earth magnet in which only the Ni plating on the surface of the magnet is selectively dissolved without giving any damage to a rare earth magnet base material having low corrosion resistance, whereby the rare earth magnet can be recovered as it is and re-plated or the like.

Solution to Problem

As a result of intensive studies to solve the above-mentioned problems, the present inventors have found that a magnet can be recycled without deteriorating its magnetic characteristics by treating the magnet with a liquid containing a derivative of nitrobenzene and ethylenediamine, thereby completing the present invention.

That is, the present invention provides the following method for recycling a rare earth magnet.

1. A method for recycling a rare earth magnet, including immersing a rare earth magnet having a film containing Ni on the surface thereof in a solution containing a derivative of nitrobenzene, ethylenediamine, and ammonia.
2. The method for recycling a rare earth magnet as set forth in 1, wherein the derivative of nitrobenzene is at least one sodium nitrobenzene sulfonate selected from the group consisting of sodium o-nitrobenzene sulfonate, sodium m-nitrobenzene sulfonate, and sodium p-nitrobenzene sulfonate.

3. The method for recycling a rare earth magnet as set forth in 1 or 2, wherein the rare earth magnet having the film containing Ni on the surface thereof is a defective product generated in a production process of the rare earth magnet.
4. The method for recycling a rare earth magnet as set forth in any of 1 to 3, wherein an ultrasonic wave having a frequency of 20 to 100 kHz is applied to the stripping solution while the rare earth magnet having the film containing Ni on the surface thereof is immersed in the stripping solution.
5. The method for recycling a rare earth magnet as set forth in any of 1 to 4, wherein the rare earth magnet having the film containing Ni on the surface thereof is immersed in the stripping solution at an immersion temperature of 20 to 70° C.
6. The method for recycling a rare earth magnet as set forth in any of 1 to 5, wherein the stripping solution has a pH of 10.0 to 13.5.
7. The method for recycling a rare earth magnet as set forth in any of 1 to 6, wherein changes in magnetic flux density and coercive force of the rare earth magnet before and after immersion in the stripping solution are 1.0% or less.

Advantageous Effects of Invention

According to the present invention, since the Ni plating applied to the surface of the rare earth magnet can be stripped without deteriorating the characteristics of the rare earth magnet and the rare earth magnet can be recycled, the product yield of the rare earth magnet can be improved.

DETAILED DESCRIPTION OF THE INVENTION

A rare earth magnet to which the recycling method for rare earth magnets according to the present invention can be applied is a rare earth magnet having a film containing Ni on the surface, and is preferably applied to a Nd sintered magnet subjected to Ni plating (in particular, electrolytic Ni plating). Among rare earth magnets, a defective product generated in a production process of a rare earth magnet, particularly a defective product having a defect in the Ni film, can be preferably targeted for recycling. Here, the defective product mainly refers to, for example, a product having a defect (swelling, scratch, non-plating, stain, or the like) in the Ni plating film but having no problem in practical use in the magnet base material, and such a defective product can be used as a good product by performing a surface treatment again after stripping the film.

As a recycling method for rare earth magnets, in addition to the method of reusing the rare earth magnet as a good product by performing a surface treatment again after stripping the film as described above, there is also a method of returning the rare earth magnet to a raw material by a method such as solvent extraction after dissolving each element contained in the rare earth magnet in an acid. In such a method, if Ni remains in a solution or the like in which each element contained in the rare earth magnet is eluted, there is also a problem that the extraction efficiency of other elements more expensive than Ni is lowered. Since the stripping solution for the Ni-containing film used in the recycling method of the present invention can effectively separate the Ni-containing film from the rare earth magnet, the stripping solution can be applied not only to the Ni-plated product having large chips or cracks in the magnet base material and hindering practical use, but also as a pretreatment for recycling to recover expensive elements from the rare earth magnet contained in waste HDD or the like recovered from the market.

The stripping solution for stripping the Ni-containing film from the rare earth magnet used in the recycling method for the rare earth magnet according to the present invention contains an oxidizing agent for dissolving the Ni-containing film and a chelating agent for stabilizing the dissolved $Ni^{2+}$ ions. As the oxidizing agent, a derivative of nitrobenzene is used, and preferably, at least one sodium nitrobenzene sulfonate selected from the group consisting of sodium o-nitrobenzene sulfonate, sodium m-nitrobenzene sulfonate, and sodium p-nitrobenzene sulfonate is used. As the chelating agent, ethylenediamine is used from the viewpoint of stability of the complex. In addition, for the purpose of pH adjustment, ammonia water is added which is easy to achieve an appropriate pH for the stripping reaction. Therefore, it can be said that the stripping solution for stripping the Ni-containing film from the rare earth magnet used in the recycling method for the rare earth magnet according to the present invention is a solution obtained by adjusting the pH of a solution containing a derivative of nitrobenzene and ethylenediamine with ammonia. As described above, in the recycling method for the rare earth magnet according to the present invention, since a cyanide compound such as sodium cyanide is not used as a complexing agent, there is no fear of environmental pollution caused by cyanide waste water.

The recycling method for the rare earth magnet according to the present invention can be carried out, for example, by immersing a rare earth magnet having a Ni-containing film on its surface, which is to be treated, in the above-described stripping solution stored in a stripping tank. The immersion method is not particularly limited, and the amount of the stripping solution and the amount of the rare earth magnet to be treated may be appropriately adjusted so that the rare earth magnet to be treated is sufficiently brought into contact with the stripping solution. Both batch processing and continuous processing can be applied.

The used amount of the derivative of nitrobenzene contained in the stripping solution is preferably 20 to 50 g/L, and more preferably 30 to 40 g/L. A saturated amount of dissolution of the derivative of nitrobenzene, particularly the nitrobenzene sulfonate salt, relative to water is about 200 g/L, and when the used amount is in the above-mentioned range, precipitation can be prevented as long as the amount is a realistic solvent evaporation amount (up to 75 vol % is allowable).

The used amount of ethylenediamine contained in the stripping solution is preferably 50 to 150 g/L, and more preferably 80 to 120 g/L. Since Ni after dissolution is present in the form of $[Ni(en)_3]^{2+}$, three times the amount of substance of the derivative of nitrobenzene is stoichiometrically required. If the used amount is within the above-mentioned range, it becomes about 10 times, so that the complex can exist very stably. Note that in order to prevent a decrease in concentration due to volatilization, it is preferable to provide a lid in the stripping tank.

The pH of the stripping solution is preferably 10.0 to 13.5, and more preferably 10.5 to 12.0. For pH adjustment, 25% ammonia water can be used, and the used amount thereof is preferably 10 to 80 g/L. Here, the pH immediately after adjusting the stripping solution is about 11.0, and the pH increases as the dissolution of Ni proceeds. When the pH exceeds 12.0, the stripping rate begins to decrease little by little, and finally, when the stripping capacity is lost, the pH becomes around 13.5. The stripping solution can dissolve 10 to 20 g of Ni in 1 L, and it is economical to use up the stripping solution once adjusted until it loses its capacity and then renew it. In addition, when the pH at the time of adjustment is below 10.0, the stripping rate is significantly reduced. The pH value referred to herein is a measured value at 15 to 25° C., and a commercially available device can be used as a measuring device. The concentration of ammonia in the ammonia water used for pH adjustment is not limited to 25% by mass and can be appropriately changed. When the concentration of ammonia in the ammonia water used for pH adjustment is other than 25% by mass, the used amount of ammonia water is, for example, an amount equivalent to the amount of ammonia used when 25% ammonia water is used in the above-described amount. That is, when the concentration of ammonia in the ammonia water used for pH adjustment is other than 25% by mass, the used amount of ammonia water is preferably 10 to 80 g/L in terms of 25% ammonia water.

Furthermore, the immersion temperature of the rare earth magnet in the stripping solution is preferably 20 to 70° C., and more preferably 45 to 55° C. Within such a range, it is possible to suppress a decrease in the stripping rate of the film due to a low solution temperature of the stripping solution, and to maintain good magnetic characteristics after assembling the rare earth magnet after stripping. In addition, the pH of the stripping solution may exceed 13 at the maximum, and there is a risk that the Nd sintered magnet undergoes thermal demagnetization as the solution temperature is higher. Therefore, it is desirable that the stripping tank storing the stripping solution has a temperature control mechanism for preventing excessive temperature rise in a heating facility such as a heater.

It is preferable that the stripping tank storing the stripping solution has a rotary barrel or a shake mechanism for preventing the stripping residue. By having such a mechanism, the film can be efficiently stripped. Although not particularly limited, since the rare earth magnet after the film has been removed is easily chipped, the rotation speed in the case of particularly introducing a barrel rotating mechanism is preferably 10 rpm or less, and when a chemical-resistant sphere (for example, $Al_2O_3$, $Zr_2O_3$, or the like) is inserted into about twice the volume of the rare earth magnet to be stripped, there is a great effect in preventing chipping and cracking.

From the viewpoint of improving the stripping rate during stripping, it is preferable to apply an ultrasonic wave having a frequency of 20 to 100 kHz to the stripping solution during immersion of the rare earth magnet in the stripping solution. As a result, not only the stripping rate of the film is improved, but also the adhesion between the rare earth magnets and the stripping residue caused by the contact with the stripping tank can be greatly improved. In this case, since it becomes difficult to control the solution temperature by applying ultrasonic waves, it is preferable that the capacity of the stripping tank storing the stripping solution is 50 L or more. When the film is stripped under such conditions, the film containing Ni can be stripped at a rate of 5 to 20 µm/hr with the stripping solution immediately after the adjustment, and the stripping can be performed very efficiently as compared with the prior art.

In the recycling method for the rare earth magnet according to the present invention, a solution containing a derivative of nitrobenzene, ethylenediamine, and ammonia strips a film containing Ni, but hardly corrodes the base material of the rare earth magnet, so that the magnetic characteristics of the rare earth magnet are hardly changed before and after the stripping of the film containing Ni, and as a result, it is possible to carry out Ni plating treatment again without carrying out a separate treatment after the stripping of the film, and recycling efficiency is extremely high. The changes in the residual magnetic flux density and the coercive force before and after the stripping of the film are preferably 1.0% or less, and more preferably 0.5% or less, in consideration of variations among individuals and lots.

EXAMPLES

Hereinafter, the present invention will be described in more detail with reference to examples, but the present invention is not limited thereto.

Example 1

70 L of a stripping solution having a composition of 40 g/L of sodium m-nitrobenzene sulfonate, 100 g/L of ethylenediamine, and 40 g/L of 25 wt % ammonia water was prepared and stored in a stripping tank. A Nd sintered magnet having a length of 7 mm, a width of 7 mm, and a thickness of 1.5 mm was immersed in the stripping solution stored in the stripping tank for 96 hours under the conditions shown in Table 1, and the presence or absence of weight loss before and after immersion was checked. Thereafter, each of the Nd sintered magnets after the immersion was magnetized and heat-treated in an oven at 120° C. for 1 hour, and then magnetized again to measure magnetic characteristics with a pulse tracer (manufactured by Toei Industry Co., Ltd.). The results are shown in Table 1.

Example 2

The test was carried out in the same manner as in Example 1 except that 15 g/L of Ni was dissolved and the pH became 13.

Example 3

70 L of a stripping solution having a composition of 20 g/L of sodium m-nitrobenzene sulfonate, 100 g/L of ethylenediamine, and 40 g/L of 25 wt % ammonia water was prepared and stored in a stripping tank. Other than that, the test was carried out in the same manner as in Example 1. The results are shown in Table 1.

Comparative Example 1

The test was carried out in the same manner as in Example 1 except that 80 g/L of ethylenediamine was used and 20 g/L of ethylenediaminetetraacetic acid was used as a chelating agent. The results are shown in Table 1.

Comparative Example 2

The test was carried out in the same manner as in Example 3 except that ammonium chloride and oxalic acid were used instead of 25 wt % ammonia water to adjust the pH of the stripping solution to 11. The results are shown in Table 1.

TABLE 1

| Stripping solution | Immersion temperature [° C.] | Ultrasonic wave [kHz] | Immersion time [hr] | pH [—] | Weight loss [wt %] | Magnetic flux density*2 [%] | Coercive force*3 [%] |
|---|---|---|---|---|---|---|---|
| Example 1 | 50 | 26 | 96 | 11 | ±0.0 | ±0.0 | −0.4 |
| Example 2 | | | | 13*1 | ±0.0 | ±0.0 | −0.4 |
| Example 3 | | | | 11 | ±0.0 | ±0.0 | −0.4 |
| Comparative Example 1 | | | | 11 | −0.2 | ±0.0 | −4.5 |
| Comparative Example 2 | | | | 11 | −2.1 | −1.9 | −4.4 |

*1 The solution on the verge of losing its stripping capacity was used. All other values were those immediately after adjustment.
*2 The demagnetization curves were measured and compared by the value of the intersection with the line of Pc (permeance) = 0.
*3 The demagnetization curves were measured and compared in terms of coercive force at 90% magnetic flux density.

As shown in Table 1, when the stripping solutions of Examples 1 to 3 were used, the base material of the Nd sintered magnet was not corroded at all before and after immersion, and the magnetic characteristics were not deteriorated at all. On the other hand, when the stripping solutions of Comparative Examples 1 and 2 were used, it was found that the base material of the Nd sintered magnet was corroded only by immersion, and the magnetic characteristics were also significantly deteriorated. It is considered that this is because components such as oxalate ions and chloride ions used to adjust the pH of the stripping solution corrode the base material of the Nd sintered magnet.

As described above, a Nd sintered magnet for HDD having a thickness of 3.0 mm, which was subjected to electrolytic Ni plating with a minimum thickness of 10 μm, was immersed in the stripping solutions of Examples 1 and 3, which did not corrode the base material of the Nd sintered magnet, and was treated under the conditions of a temperature of the stripping solution of 50° C. and application of ultrasonic waves of 26 kHz until the plated film was completely stripped, and the weight loss was recorded. After the stripping was confirmed, a new Nd sintered magnet of the same shape was inserted again, and this operation was repeated until stripping residue of the plated film was generated, and the accumulated weight loss was recorded as the Ni stripping capacity. The magnet after stripping was re-plated and subjected to reliability tests (corrosion resistance, adhesion force). The results are shown in Table 2.

TABLE 2

| Stripping solution | Immersion temperature [° C.] | Ultrasonic wave [kHz] | Immersion time [hr] | Strippping capacity [g/L] | Corrosion resistance after plating*1 | Adhesion force after plating*2 |
|---|---|---|---|---|---|---|
| Example 1 | 50 | 26 | 1.5 | 17.4 | Good | Good |
| Example 3 | | | | 9.7 | Good | Good |

*1 No rust in pressure cooker test (exposed to saturated steam of 2 atm at 120° C. for 48 hours).
*2 Tensile test result 100 kg/cm² or more.

From the composition of the stripping solution and Table 2, it was suggested that the stripping capacity depends on the amount of oxidizing agent (derivative of nitrobenzene) contained in the stripping solution. In addition, the Nd sintered magnet in which the plating film was stripped using the stripping solutions of Examples 1 and 3 and re-plated was excellent in both corrosion resistance and adhesion force.

As described above, the stripping solutions of Examples 1 to 3 did not corrode the base material of the Nd sintered magnet, and thus did not deteriorate the magnetic characteristics, and did not cause a problem in the plating properties in the re-plating treatment after stripping the plating film. Thus, it has been shown that the stripping solution of the present invention can strip the Ni plating applied to the surface of the Nd sintered magnet without deteriorating the magnetic characteristics of the magnet and re-plate the magnet to recycle the magnet, thereby improving the product yield.

The invention claimed is:

1. A method for recycling a rare earth magnet, the method comprising:
   immersing a rare earth magnet having a film comprising Ni on the surface thereof in a stripping solution comprising a derivative of nitrobenzene, ethylenediamine, and ammonia,
   wherein a stripping tank storing the solution has a barrel rotating mechanism, a barrel of the barrel rotating mechanism contains the rare earth magnet and chemical resistant spheres, and a number of revolutions per minute of the barrel rotating mechanism is 10 rpm or less.

2. The method for recycling a rare earth magnet according to claim 1, wherein the derivative of nitrobenzene is at least one sodium nitrobenzene sulfonate selected from the group consisting of sodium o-nitrobenzene sulfonate, sodium m-nitrobenzene sulfonate, and sodium p-nitrobenzene sulfonate.

3. The method for recycling a rare earth magnet according to claim 1, wherein the rare earth magnet having the film comprising Ni on the surface thereof is a defective product generated in a production process of the rare earth magnet.

4. The method for recycling a rare earth magnet according to claim 1, wherein an ultrasonic wave having a frequency of 20 to 100 kHz is applied to the stripping solution while the rare earth magnet having the film comprising Ni on the surface thereof is immersed in the stripping solution.

5. The method for recycling a rare earth magnet according to claim 1, wherein the rare earth magnet having the film comprising Ni on the surface thereof is immersed in the stripping solution at an immersion temperature of 20 to 70° C.

6. The method for recycling a rare earth magnet according to claim 1, wherein the stripping solution has a pH of 10.0 to 13.5.

7. The method for recycling a rare earth magnet according to claim 1, wherein changes in magnetic flux density and coercive force of the rare earth magnet before and after immersion in the stripping solution are 1.0% or less.

* * * * *